Figure 1:
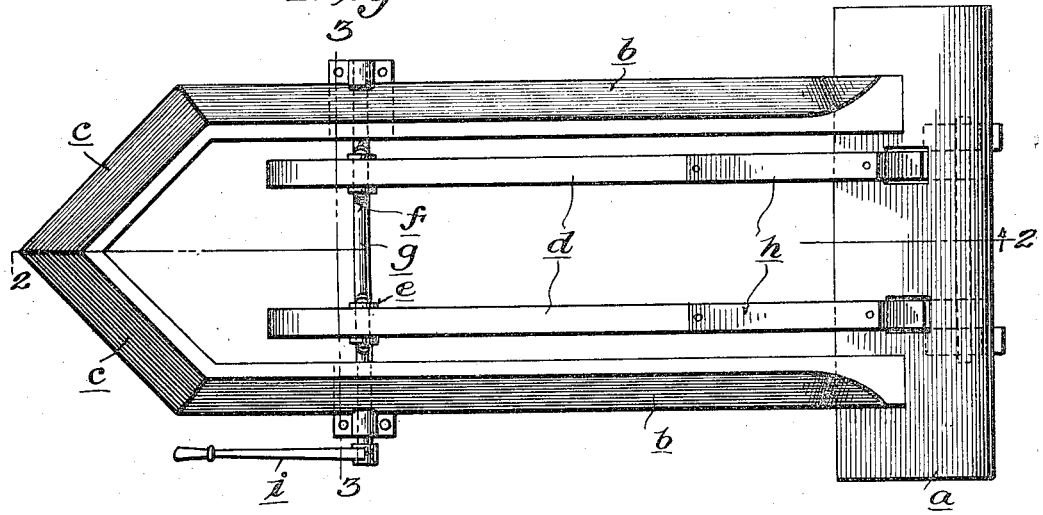

J. W. & J. CADE.
MOTOR VEHICLE JACK.
APPLICATION FILED JULY 7, 1917.

1,252,395.

Patented Jan. 8, 1918.

Witness
Chas. L. Grieshauer.

Inventors
J. W. Cade
Jack Cade
By Davis & Davis
Attorneys

UNITED STATES PATENT OFFICE.

JAMES W. CADE AND JACK CADE, OF MOUNT CARMEL, SOUTH CAROLINA.

MOTOR-VEHICLE JACK.

1,252,395.     Specification of Letters Patent.     Patented Jan. 8, 1918.

Application filed July 7, 1917. Serial No. 179,167.

*To all whom it may concern:*

Be it known that we, JAMES W. CADE and JACK CADE, citizens of the United States of America, and residents of Mount Carmel, county of Abbeville, and State of South Carolina, have invented certain new and useful Improvements in Motor-Vehicle Jacks, of which the following is a full and clear specification.

The object of this invention is to provide a simple appliance onto which a motor vehicle may be run and which will be provided with simple means for elevating the vehicle sufficiently to take its inflated tires off the floor, to thereby relieve the tires of the weight of the vehicle and thus prolong the life of the tires, as more fully hereinafter set forth.

In the drawing—

Figure 2:
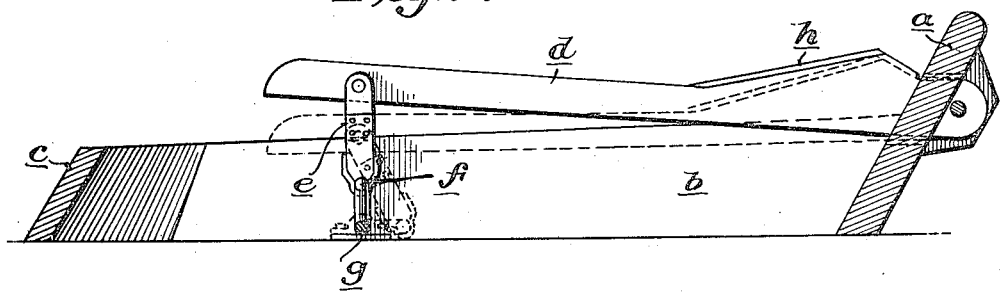

Figure 1 is a plan view;

Fig. 2 a vertical sectional view on the line 2—2 of Fig. 1; and

Figure 3:
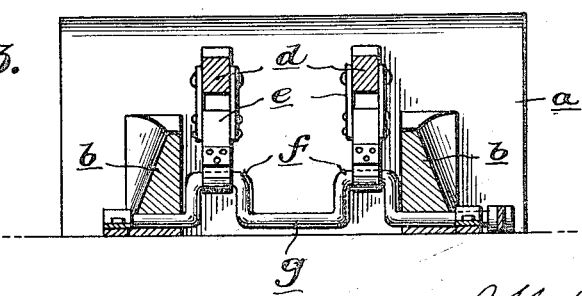

Fig. 3 a transverse section on the line 3—3 of Fig. 1, showing the preferred form of our apparatus.

Our apparatus consists of an upwardly inclined backboard $a$ whose lower edge is adapted to rest upon the floor, a pair of spaced forwardly-projecting guide-beams $b$ affixed rigidly to the board $a$ and having their forward ends connected by forwardly-extending extensions $c$ which incline toward each other and form a cow-catcher-like forward end. The outer faces of the guide-boards $b$ and their extensions $c$ are inclined upwardly and inwardly.

Within the substantially U-shaped frame formed by the bars $b$ and $c$ is a pair of lifting bars $d$ whose rear ends are pivotally connected to the back-board $a$ on a horizontal axis and whose forward ends are pivotally supported within the bifurcated upper ends of a pair of pitmen $e$ whose lower ends are strapped pivotally to crank-arms $f$ carried by shaft $g$ journaled in the lower edges of the guide-beams $b$. The rear ends of the lifting-beams $d$ are provided with upwardly and rearwardly inclined projections $h$. The beams $d$ are so positioned in the appliance that when an automobile is backed astride the floor frame $b$, $c$, the usual differential-casing will lie between the beams and the axle housing will strike against and possibly slide up the inclined faces of the enlargements $h$ a slight distance. The rear wheels generally abut against the back-board $a$. When the vehicle is backed to this position, the crank shaft $g$ will be rotated a quarter turn by means of a handle $i$ or otherwise, whereupon the forward ends of the lifting-beams $d$ will be elevated to engage the front axle and thus lift the machine entirely free of the ground. The idea in forming the forward end of the floor frame in the shape of a cow-catcher and inclining the outer faces of the bars $b$ and $c$ is to insure proper guidance of the vehicle in backing back to a position astride the apparatus.

It will be observed that by bringing the forward ends $c$ of the guide boards together at the center of the apparatus, the front end of the guide frame is thereby closed against the entrance of the wheels of the vehicle when the same is backed onto the apparatus, whereby injury to the crank-shaft lifting beams by the vehicle wheels backing thereagainst is avoided absolutely. It will be observed also that the handle $i$ is set at an angle of 90 degrees with respect to the cranks $f$, so that when the cranks are turned down the handle will stand upright, and when the cranks are turned up the handle will lie against the ground or floor and thus lock the cranks in their up position.

The nature and scope of the invention having been thus indicated and its preferred embodiment having been specifically described, what is claimed as new is:

In a device of the class set forth, a floor frame comprising a backboard, a pair of side beams attached thereto and having forwardly-inclined extensions at their forward ends, said extensions meeting centrally of the forward end of the apparatus, the outer faces of said side beams and their said extensions being beveled upwardly and inwardly, a pair of lifting beams pivotally supported at their rear ends upon said floor frame and provided with upwardly and rearwardly inclined enlargements at their rear ends, and means at the forward ends of the lifting beams for simultaneously raising and lowering said forward ends.

In testimony whereof we hereunto affix our signatures this 5th day of July, 1917.

JAMES W. CADE.
JACK CADE.

Copies of this patent may be obtained for five cents each, by addressing the "Commissioner of Patents, Washington, D. C."